United States Patent [19]

Franklin et al.

[11] Patent Number: 5,321,917

[45] Date of Patent: Jun. 21, 1994

[54] TOOL FOR FINISHING TERMINATED FIBER OPTIC CABLE

[75] Inventors: Vinod J. Franklin, Hershey; James D. Kevern, Wellsville, both of Pa.

[73] Assignee: The Whitaker Corporation, Wilmington, Del.

[21] Appl. No.: 88,711

[22] Filed: Jul. 8, 1993

[51] Int. Cl.⁵ .............................................. B24B 7/22
[52] U.S. Cl. .................. 51/217 R; 51/217 P
[58] Field of Search .......... 51/217 R, 217 P, 217 A, 51/216 R, 216 A, 283 R, 4

[56] References Cited

U.S. PATENT DOCUMENTS

| | | | |
|---|---|---|---|
| 1,610,206 | 12/1926 | Gabriel et al. | 51/217 R |
| 4,178,722 | 12/1979 | Forman et al. | 51/170 T |
| 4,272,926 | 6/1981 | Tamulevich | 51/216 R |
| 4,330,965 | 5/1982 | Clark | 51/217 R |
| 4,492,060 | 1/1985 | Clark | 51/283 R |
| 4,498,260 | 2/1985 | Doty | 51/217 R |
| 4,649,670 | 3/1987 | Snyder | 51/284 R |
| 4,693,035 | 9/1987 | Doyle | 51/284 R |
| 4,711,053 | 12/1987 | Snyder | 51/3 |
| 4,776,136 | 10/1988 | Abendschein et al. | 51/216 R |
| 4,819,386 | 4/1989 | Struyf | 51/217 R |

FOREIGN PATENT DOCUMENTS

| | | | |
|---|---|---|---|
| 0161256 | 9/1984 | Japan | 51/283 R |
| 0217055 | 10/1985 | Japan | 51/216 A |
| 0232977 | 9/1988 | Japan | 51/216 A |

Primary Examiner—Robert A. Rose

[57] ABSTRACT

A fixture for positioning and holding fiber optic cables for polishing is disclosed. The fixture includes a cable clamping mechanism consisting of a pair of links that are pivotally attached to movable portions of a nest that receives and holds the terminated end of the cable. A holding member is positioned above the nests to steady and hold the cables in rough position while the nest accurately positions the fiber optic end for polishing. A dovetail member is provided to accurately attach the fixture to the polishing machine. The fixture is arranged to not contact the abrasive material during polishing.

25 Claims, 4 Drawing Sheets

TOOL FOR FINISHING TERMINATED FIBER OPTIC CABLE

The present invention relates to a fixture for holding a terminated fiber optic cable in a polishing machine for grinding and polishing the end of the optical fiber.

BACKGROUND OF THE INVENTION

Polishing machines for grinding and polishing the ends of fiber optic cables are usually of the type having a rotating abrasive disk that is maintained relatively flat. The optical fiber is secured in a fixture having a flat bottom. The end of the optical fiber that is to be polished projects slightly below this bottom surface, sometimes under the urging of a spring mechanism to control the forces on the fragile optical fiber. The fixture, with its fiber optic cable attached, is carefully lowered onto the rotating abrasive disk and made to undergo a standard polishing pattern such as circular or figure eight. There are usually three or more stages of polishing that must be done in sequence, from relatively course abrasive to very fine. In the final stage the bottom surface of certain fixtures contacts the abrasive disk so that the end of the optical fiber is polished to a flat surface that is normal to the longitudinal axis of the connector terminated to the fiber optic cable. However, this subjects the bottom surface of the fixture to wear and it must be replaced occasionally. Other prior art fixtures rely upon the tips of the optical fibers themselves in contact with the abrasive surface to maintain the axes of the fixture and the cables somewhat perpendicular to the surface of the abrasive material. In these fixtures the fixture itself does not contact the abrasive material and therefor does not wear, however, the perpendicularity of the final polished surface to the axis of the cable is dependant upon variations in the manufacturing of the terminated cables. That is, when the cables are loaded into the fixture they are positioned with respect to some feature of the connector such as a shoulder. This results in the tips of the optical fibers extending below the bottom surface of the fixture by varying amounts, the three tips that extend the farthest being the ones that establish the initial angle between the axes and the abrasive surface. With such an arrangement some of the optical fibers are over polished while others may be under polished resulting in inconsistency and varying quality. Fixtures used with these machines are frequently complex, especially those utilizing spring mechanisms such as is disclosed in U.S. Pat. No. 4,330,965 which issued May 25, 1982 to Clark. Simpler fixtures are in use such as those disclosed in U.S. Pat. Nos. 4,819,386, which issued Apr. 11, 1989 to Struyf and 4,276,926 which issued Jun. 16, 1981 to Tamulevich. The '386 patent discloses a fixture having a body with a number of cavities or nests, each for receiving a terminated fiber optic cable, and a retainer plate that is assembled to the body after the cables are in place to hold them captive. The connector attached to the end of the cable has a spring element that is compressed within the nest thereby urging the optical fiber toward and past the bottom of the fixture. This spring element that is part of the connector, provides a similar benefit as the spring element in the more complex fixture disclosed in the '965 patent mentioned above. However, this fixture is dependent on the terminated cable having a spring biased connector.

In all of the above prior art fixtures the terminated end of the cable is located in the fixture by banking a feature of the connector or cable on a shoulder or some other surface of the fixture and allowing the tips of the cables to extend past the bottom surface of the fixture by random amounts. In the case of a single cable fixture this presents no problem, however, in multiple cable fixtures problems of alignment and quality arise.

What is needed is a relatively simple fixture that locates the tips of the optical fibers in a plane that is parallel with the abrasive surface prior to polishing and where the fixture is maintained in this plane during polishing, thereby obviating the alignment and quality problems mentioned above or the need to contact the abrasive material to maintain vertical alignment. Additionally, such a fixture should not need to be taken apart to receive the fiber optic cables for polishing, assembled, and then again taken apart to remove the finished cables.

SUMMARY OF THE INVENTION

A novel fixture is set forth for positioning and holding, in a polishing machine having abrasive material, an end of a terminated fiber optic cable having an optical fiber disposed along a longitudinal axis therein. The fixture is adapted to be spaced from the abrasive material while it holds and properly positions the optical fiber in polishing engagement with the abrasive material during operation. The fixture includes a base, a nest in the base for positioning and holding the terminated end of the cable. The nest has first and second portions of which the first is movable toward the second to a clamping position to clampingly engage and hold the terminated end of the cable and is movable away therefrom to a release position to release the terminated end of the cable. A clamping mechanism is provided that is interactive with the first portion for effecting the movement toward and away from the second portion. Means is provided for positioning and securing the fixture to the polishing machine so that the longitudinal axis is arranged at a predetermined angle to the abrasive material.

DESCRIPTION OF THE PREFERRED EMBODIMENT

Figure 1:
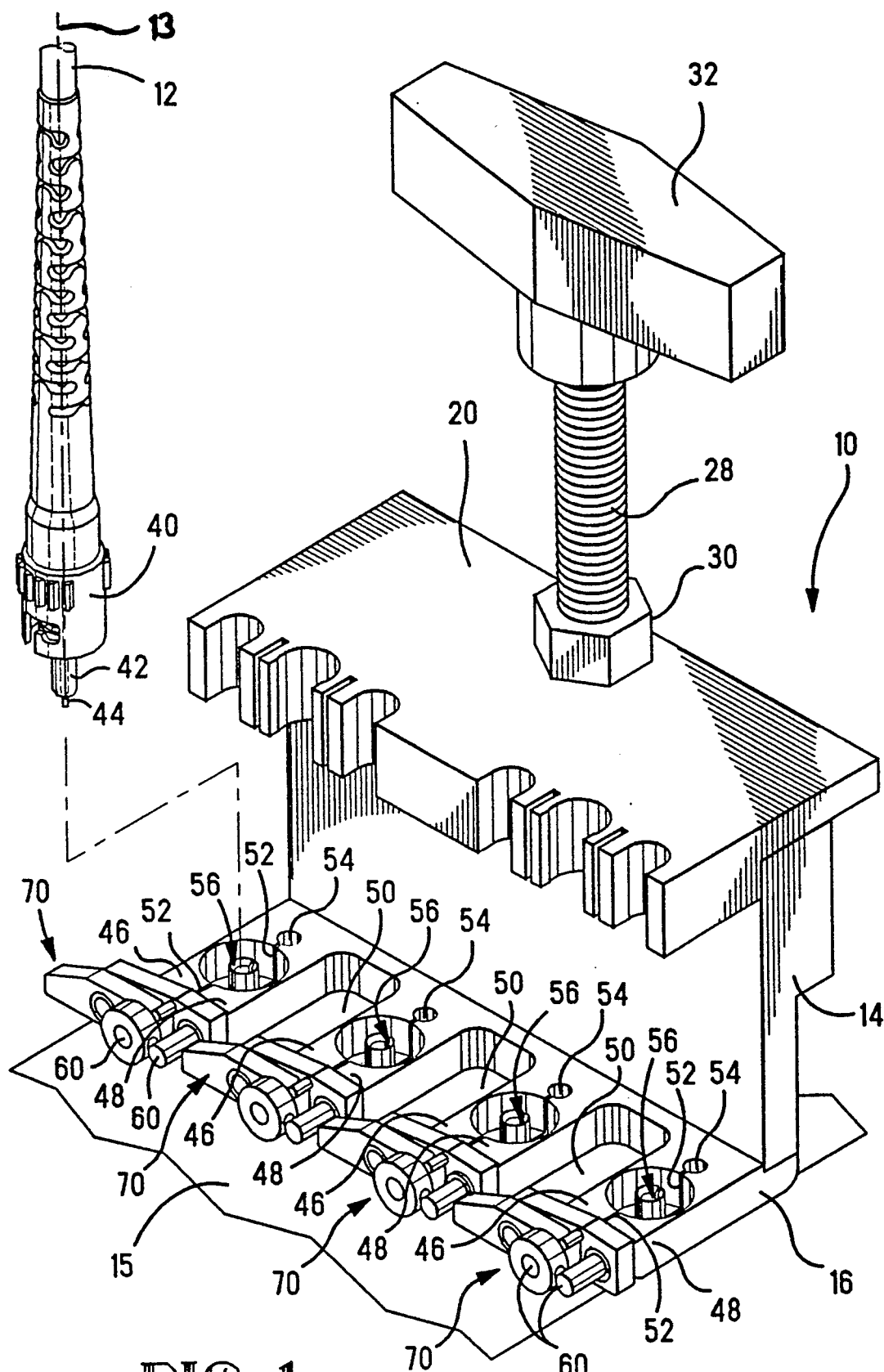
FIG. 1 is an isometric view of a fixture illustrating the teachings of the present invention.
Figure 2:
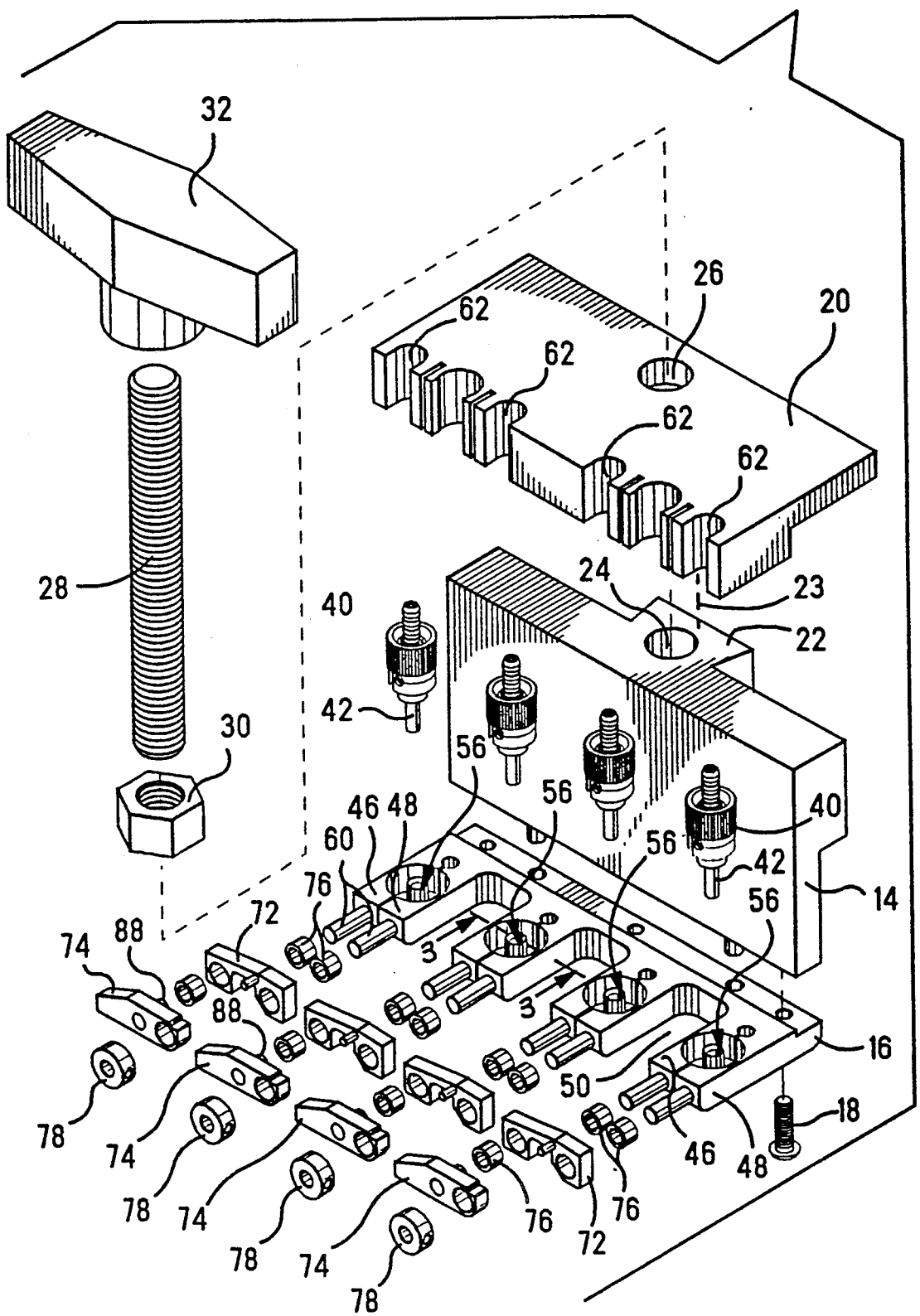
FIG. 2 is an exploded parts view of the fixture shown in FIG. 1.

There is shown in FIGS. 1 and 2 a fixture 10 for positioning and holding fiber optic cables 12 in a polishing machine, not shown, so that the axis 13 of the terminated end of each cable is normal to the abrasive material 15 during polishing. The term "polishing", as used herein, will be understood to include grinding as well as polishing. The fixture includes a frame 14, a base plate 16 attached to one side of the frame along a bottom edge by means of screw fasteners 18, and a cable holder 20 attached to the opposite side along a top edge of the frame. As best seen in FIG. 2, the frame 14 includes a dovetail 22 having an axis 23 formed normal to the base plate 16 and a threaded hole 24 in the top edge. The dovetail 22 is used to accurately attach the fixture 10 to the machine for polishing. A clearance hole 26 is provided in the cable holder 20, in alignment with the threaded hole 24, for receiving a threaded stud 28. The stud 28 is threaded into the hole 24 with the cable holder in place and a nut 30 tightened in place to secure the cable holder 20 to the frame 16. A T-handle 32 is threaded onto the free end of the stud 28 for use in manually manipulating the fixture.

Figure 3:
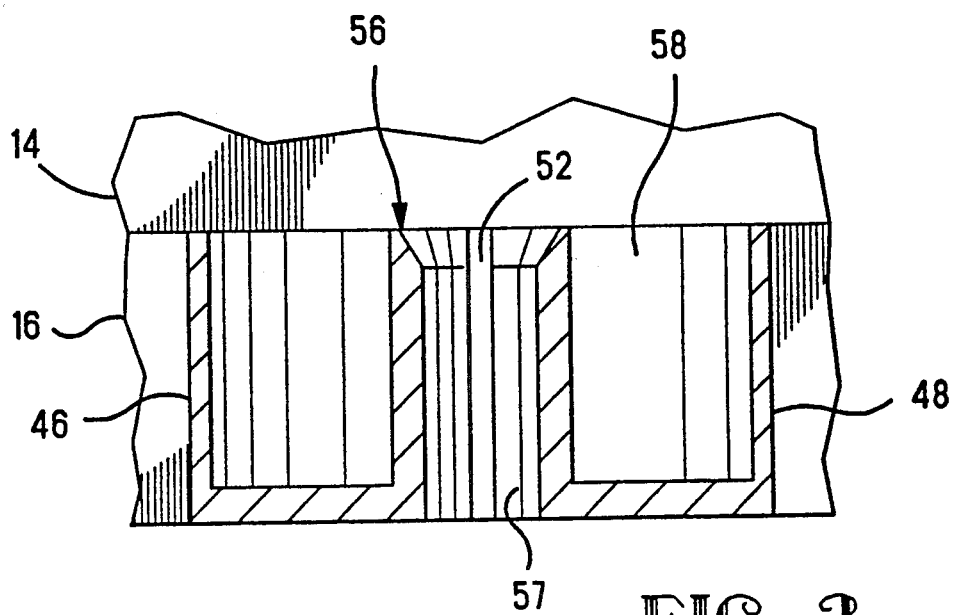
FIG. 3 is a cross-sectional view taken along the lines 3—3 of FIG. 2.

The cable 12, as shown in FIGS. 1 and 2, is terminated with a bayonet type connector 40 having a ceramic ferrule 42 containing the optical fiber 44, which is shown extending from the ferrule by an exaggerated amount for clarity. The bayonet type connector described above is by way of example only. It will be understood that fixtures incorporating the teachings of the present invention can accept most known optical fiber connectors and ferrule materials that are in use. The base plate 14 has four pairs of cantilevered arms, 46 and 48 in each pair respectively, separated by cutouts 50. A slot 52 terminating in a relief hole 54 separates each of the cantilevered arms 46 and 48, as shown. Each pair of cantilevered arms 46, 48 contain a nest 56, as best seen in FIG. 3, each arm containing a portion of the nest. Each nest 56 includes a through hole 57 sized to be a close slip fit with the ferrule 42 of the connector 40. In the present example the axis of the hole 57 is parallel with the axis 23 of the dovetail 22 so that the final polished surface of the optical fiber is normal to the axis 13 of the cable. However, in the event that it is desired that the polished surface not be normal to the axis of the cable but rather be arranged on a specific angle, the holes 57 of the four nests 56 may be formed so that they are tilted with respect to the axis 23 of the dovetail 22 so that the desired angle is achieved. A counter bore 58 is provided for clearance for certain connectors that have a shroud or other similar feature that may interfere with proper seating in the nest. Only the connector 40 without the shroud is shown here, however, it will be understood that the teachings of the present invention may be advantageously utilized with any connector having a ferrule 42, or similar structure that may be accommodated by the nest 56. Each cantilevered arm 46 and 48 has a pin 60 extending from its free end for a purpose that will be explained below. The cable holder 20 is made of a resilient material, such as a plastic polymer, and has four openings 62 along one edge so that each opening is vertically above a respective nest 56, as viewed in FIG. 1. The walls of the openings 62 are somewhat resilient and are sized to grip the outer jacket of the cable 12 or connector strain relief when forced into the opening and to hold it securely in place.

Figure 4:
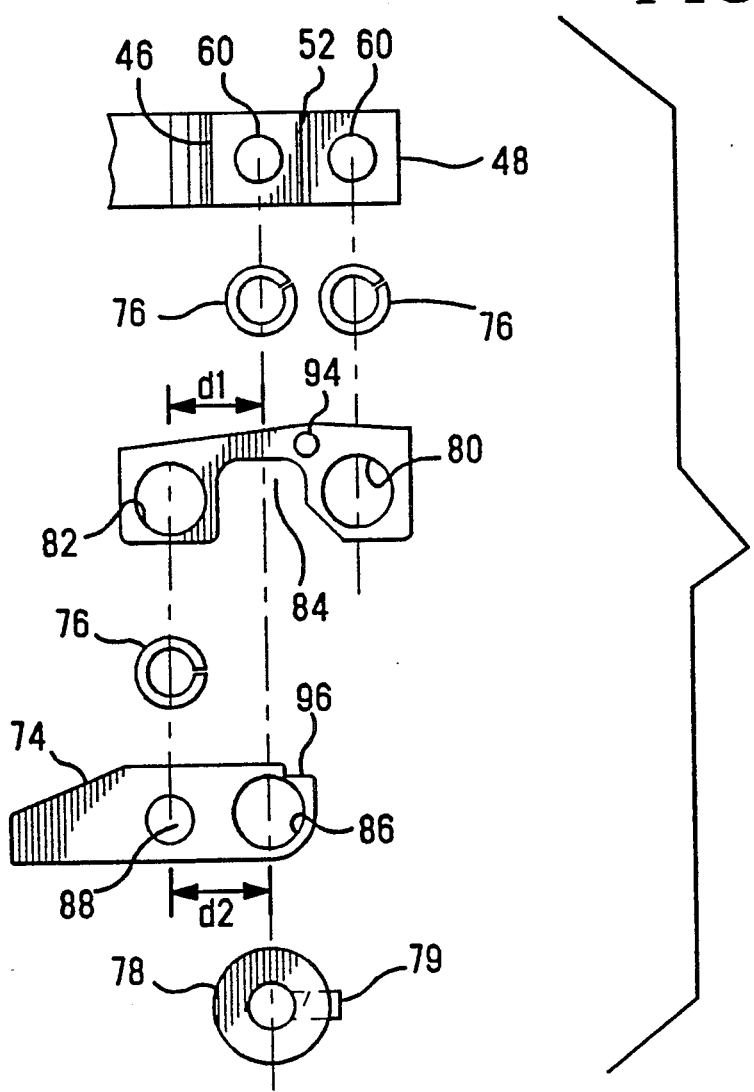
FIG. 4 is a front view of the two links of the clamping mechanism showing their proper alignment with respect to the fixture base.
Figure 5:
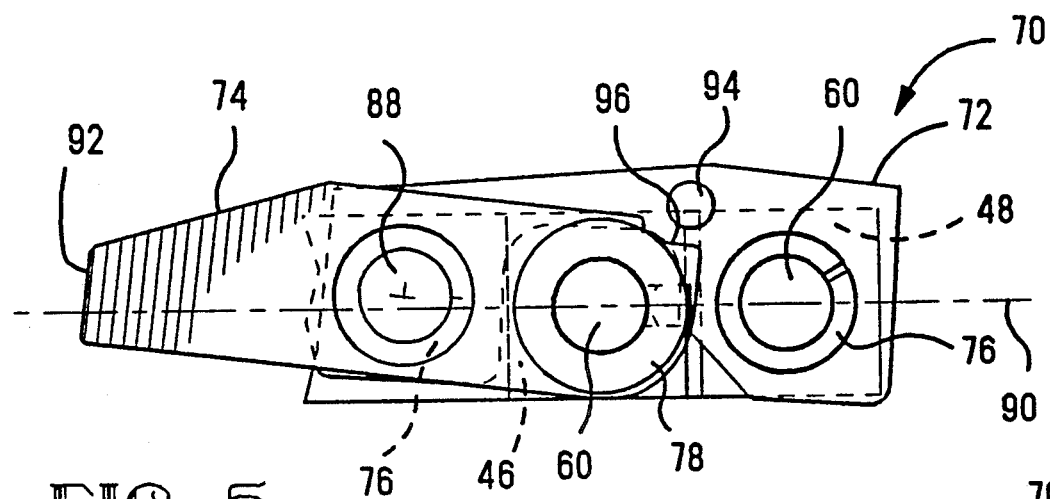
FIG. 5 is a front view of the clamping mechanism in its released position.
Figure 6:
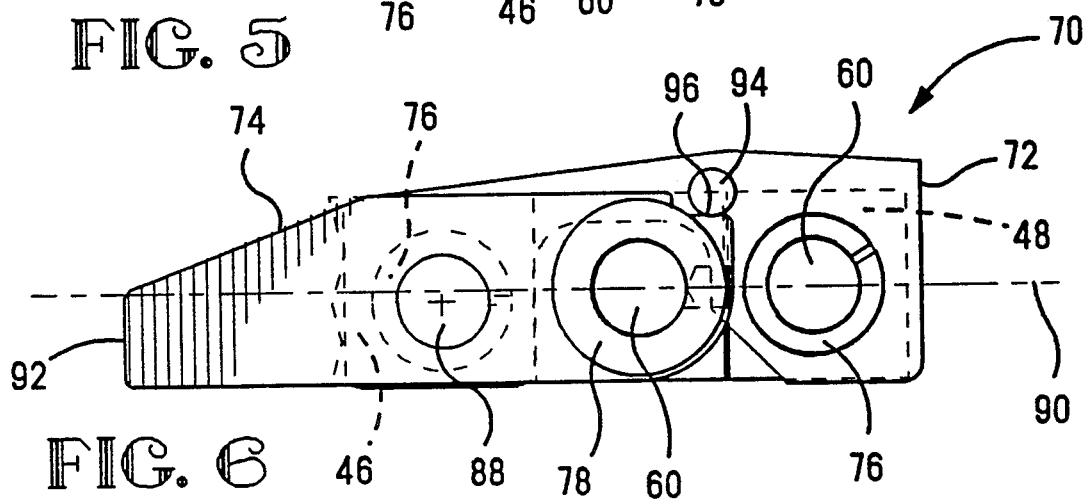
FIG. 6 is a front view of the clamping mechanism in its clamped position.

Each nest 56 has a clamping mechanism 70 associated therewith. As best seen in FIGS. 1, 2, and 4, the clamping mechanism includes a pair of links 72 and 74, three bushings 76, and a retaining collar 78. The link 72 includes a hole 80 in one end thereof and a similar hole 82 in the other end thereof, both of which are sized to be a slip fit with the bushings 76. A cutout 84 is disposed between the two holes as shown in FIG. 4. The link 74 includes a hole 86 in one end thereof also sized to be a slip fit with the bushing 76. A pin 88 projects inwardly from the link 74, as viewed in FIG. 4, for a distance about equal to the thickness of the link 72. The diameter of the pin 88 is identical to the diameter of the pins 60. The holes in the bushings 76 are sized to be a close slip fit with these pins. As shown in FIGS. 4, and 5, the links 72 and 74 are assembled to the pins 60 of the base plate 14 with the hole 80 of the link 72 and associated bushing 76 on the pin 60 of the arm 48, and the hole 86 of the link 74 and associated bushing 76 on the pin 60 of the arm 46. This permits these two links 72 and 74 to freely pivot on the pins 60. The pin 88 of the link 74 and associated bushing 76 extend into the hole 82 of the link 72 thereby pivotally coupling the two links together. A retaining collar 78 is secured to the pin 60 of the arm 46 by means of a set screw 79 to hold the two links 72 and 74 captive to the pins 60. The centers of the hole 86 and the pin 88 are spaced so that the distance d2 therebetween is slightly greater than the distance d1 between the centers of the pin 60 of the arm 46 and the hole 82 when the link 72 is in position. This results in the two links assuming a first position shown in FIG. 5. Note that in this position, the center of the pin 88 is substantially above a horizontal plane 90 formed by the axes of the two pins 60. As the end 92 of the link 74 is pushed downwardly to a second position shown in FIG. 6, the two pins 60 are forced closer together until the center of the pin 88 crosses the plane 90. This forces the two arms to elastically move slightly thereby causing the two portions of the nest 56 to also come closer together thereby clamping the ferrule 42 securely therein. The elasticity of the arms 46 and 48 and the area of the base around the relief hole 54 provide the resiliency needed for this movement. This resiliency biases the two arms outwardly to their first position shown in FIG. 5. The movement of the two portions of the nest toward each other is normal to the axis 13 of the terminated end of the cable 12. A stop is provided consisting of a pin 94 that extends from the link 72 so that it overlays a notch 94 formed in the link 74. As the end 92 of the link 74 is pushed downwardly, the pin 94 engages a surface of the notch 96 thereby preventing further downward movement. This permits the link 74 to pivot just slightly over center, that is, the center of the pin 88 being slightly below the plane 90, so that the links will remain in this position until moved, and the ferrule 42 will remain securely clamped. This slight movement of the center of the pin 88 below the plane 90 is not enough to cause the two portions of the nest 56 to separate any significant amount, and will not adversely affect the clamping ability of the clamping mechanism. When the end 92 of the link 74 is pushed upwardly so that the center of the pin 88 moves above the plane 90, the two pins 60 are urged apart by the bias in the resilient arms causing the clamp to assume the first position shown in FIG. 5.

Figure 7:
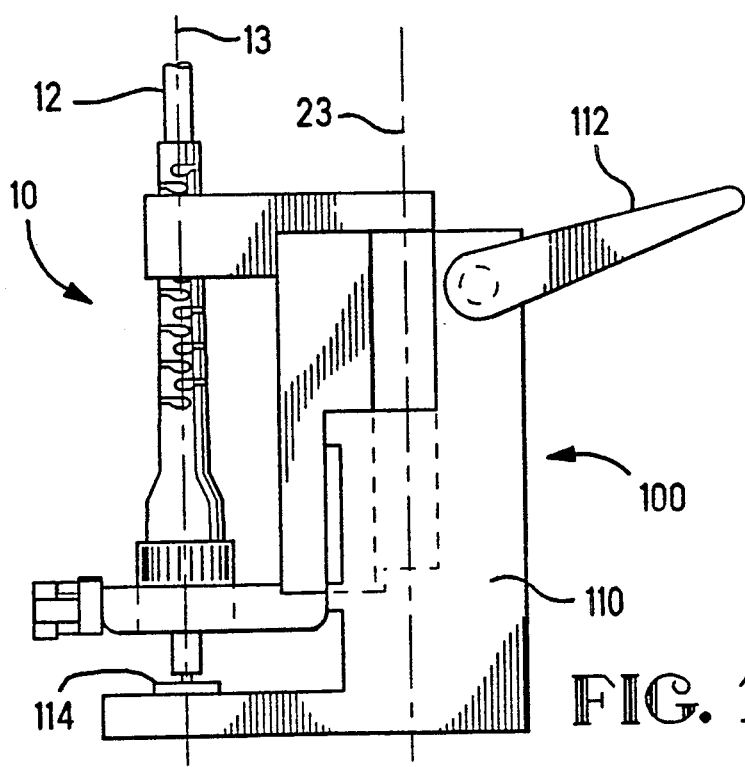
FIG. 7 is a side view showing the present fixture in a setup tool.

There is shown in FIG. 7 a loading device 100 that positions and holds the fixture 10 while loading and clamping the cables 12 in place The device 100 includes an L-shaped frame 110 having a dovetail shaped mortis that mates with the dovetail 22 of the fixture 10. The dovetail 22 is inserted into the mortis until it engages a stop surface. A locking lever and screw 112 locks the fixture securely in the loading device. The locking lever and screw contain a torque limiting device, not shown, that controls the amount of torque that can by applied and thereby assures consistent positioning of the fixture in the loading device 100. An identical locking lever and screw with torque limiting device is utilized to attach the fixture 10 to the polishing machine. The torque limiting device may be any commercially available suitable slip clutch or the like. A locating surface 114 is formed on the L-shaped frame adjacent the four nests 56 normal to the axis 23 of the dovetail 22 when the fixture is assembled to the loading device 100. When the cables 12 are inserted into the fixture 10 the tips of the ferrules 42 engage the surface 114 while the optical fibers 44 enter into clearance openings in the surface 114. Alternatively, the surface 114 may be a raised ridge, not shown, with the optical fibers 44 extending along the side of the ridge. The clamps 70 are then actuated to securely clamp the four ferrules 42 in place. The surface 114 is normal to the axes 13 of the terminated end of the cables 12 when they are in position as shown in FIG. 7, and simulates the position of the surface of the abrasive material 15 when the fixture 10 is locked in position in the polishing machine. As set forth above, in the event that it is desired that the polished surface not be normal to the axis of the cable but rather be arranged on a specific angle, the holes 57 of the four nests 56 may be formed so that they are tilted with respect to the axis 23 of the dovetail 22 so that the desired angle is achieved.

An important advantage of the present invention is that the tips of the ferrules of the terminated ends of the cables are all arranged in a plane that is normal to, or inclined a specific amount with respect to, the surface of the abrasive material prior to polishing. This assures consistent polishing results among all of the terminated cable ends being polished without the need for the fixture to contact the abrasive material, and reduces or eliminates variations in polishing among the optical fibers. Additionally, the novel clamping mechanism 70 effectively clamps onto the ferrules without causing them to move out of alignment with respect to the reference surface 114. This assures perfect alignment when the fixture is attached to the polishing machine. This clamping arrangement is universal in that it will accommodate most known connector structures with a single clamp nest. Unlike prior art fixtures the present fixture requires no disassembly or assembly when inserting the cables 12 into the fixture.

We claim:

1. A fixture for positioning and holding, in a polishing machine having abrasive material, an end of a terminated fiber optic cable having an optical fiber disposed along a longitudinal axis therein, said fixture arranged to hold said optical fiber in polishing engagement with said abrasive material, comprising:
   (a) a base;
   (b) a nest in said base for positioning and holding said terminated end of said cable, said nest having first and second portions of which said first portion is attached at one end to said base in cantilever fashion and having a free end that is movable toward said second portion to a clamping position to clampingly engage and hold said terminated end of said cable and is movable away therefrom to a release position to release said terminated end of said cable;
   (c) a clamping mechanism interactive with said portion for effecting said movement toward and away from said second portion; and
   (d) means for positioning and securing said fixture to said polishing machine so that said longitudinal axis is arranged at a predetermined angle to said abrasive material.

2. The fixture according to claim 1 wherein said second portion is attached at one end to said base in cantilever fashion and having a free end that is movable toward said first portion, wherein said movement of said first and second portions are in a direction substantially normal to said axis of said terminated end of said cable.

3. The fixture according to claim 1 wherein said base is of unitary construction.

4. The fixture according to claim 1 wherein said base includes a resilient portion between said first and second portions urging said portions into said release position.

5. The fixture according to claim 1 wherein said clamping mechanism is pivotally attached to both said first and second portions of said nest, and wherein pivotal movement of said clamping mechanism in one direction effects said clamping engagement and pivotal movement in the opposite direction effects said release.

6. The fixture according to claim 5 including resilient means between said first and second portions arranged to urge said portions mutually away to said released position when said pivotal movement of said clamping mechanism is effected in said opposite direction.

7. The fixture according to claim 6 wherein said clamping mechanism includes first and second links, said first link being pivotally attached to said first portion of said nest at a first pivot point and said second link being pivotally attached to said second portion of said nest at a second pivot point and said two links being pivotally attached to each other at a third pivot point exclusive of said first and second pivot points.

8. The fixture according to claim 7 wherein the axes of said first and second pivot points define a plane so that when said clamping mechanism is in said release position said third pivot is on one side of said plane and when said clamping mechanism is in said clamping position said third pivot is on the other side of said plane.

9. The fixture according to claim 8 wherein said base includes a pair of opposing cantilevered arms extending outwardly, said nest being disposed in opposing faces of said arms, and said resilient means including said arms and a portion of said base adjacent said arms.

10. The fixture according to claim 9 wherein said first pivotal attachment includes a pin extending from a free end of one of said cantilevered arms through a hole in said first link, and said second pivotal attachment includes a pin extending from a free end of the other of said cantilevered arms through a hole in said second link.

11. The fixture according to claim 10 wherein said first link includes an opening between said first and third pivots through which said pin of said second pivotal attachment extends.

12. The fixture according to claim 8 including stop means for positioning said third pivot on said other side of said plane when said clamping mechanism is in said clamping position, including a projection extending from said first link and arranged to engage a surface of said second link when said clamping mechanism is in said clamping position.

13. The fixture according to claim 1 including a frame attached to said base and a cable holder attached to said frame spaced from said base, said cable holder having a cable support in axial alignment with said nest for supporting a portion of said cable when said cable is held in said nest.

14. The fixture according to claim 13 including a guide member for locating and securing said fixture to said polishing machine.

15. The fixture according to claim 14 wherein said guide member is a dovetail shaped tenon.

16. The fixture according to claim 15 includes four said nests and four said cable supports in axial alignment with their respective nests, each nest having a said clamping mechanism.

17. A fixture for positioning and holding, in a polishing machine having abrasive material, the ends of terminated fiber optic cables, each having an optical fiber disposed along a longitudinal axis therein, said fixture arranged to hold said optical fibers in polishing engagement with said abrasive material, comprising:
 (a) a base;
 (b) a plurality of nests in said base for positioning and holding said terminated ends of said cables, each said nest having first and second portions of which said first portion is attached at one end to said base in cantilevered fashion and having a free end that is movable toward said second portion to a clamping position to clampingly engage and hold one of said terminated ends of said cables and is movable away therefrom to a release position to release said terminated end of said cable;
 (c) a clamping mechanism interactive with said first portion for effecting said movement toward and away from said second portion; and
 (d) means for positioning and securing said fixture to said polishing machine so that said tips of said terminated cable ends form a plane that is substantially planar to said abrasive material.

18. The fixture according to claim 17 wherein each said terminated end of said cable includes a ferrule and wherein said first and second portions of each of said nests are arranged to clampingly engage said ferrule of a respective cable.

19. In a fixture for positioning and holding, in a polishing machine having abrasive material, the ends of terminated fiber optic cables, each having an optical fiber disposed along a longitudinal axis therein, a clamping mechanism for positioning and holding said terminated end of said cable comprising:
 a plurality of nests, each of which has first and second portions of which said first portion is attached at one end to said fixture in cantilevered fashion and having a free end that is movable toward said second portion to a clamping position to clampingly engage and hold one of said terminated ends of said cables and is said one terminated end of said cable, and means interactive with said first portion for effecting said movement toward and away from said second portion.

20. The clamping mechanism according to claim 19 wherein said means for effecting said movement is pivotally attached to both said first and second portions of said nest, and wherein pivotal movement of said means in one direction effects said clamping engagement and pivotal movement in the opposite direction effects said release.

21. The clamping mechanism according to claim 20 including resilient means between said first and second portions arranged to urge said portions mutually away to said released position when said pivotal movement of said means is effected in said opposite direction.

22. The clamping mechanism according to claim 21 wherein said means includes first and second links, said first link being pivotally attached to said first portion of said nest at a first pivot point and said second link being pivotally attached to said second portion of said nest at a second pivot point and said two links being pivotally attached to each other at a third pivot point exclusive of said first and second pivot points.

23. The clamping mechanism according to claim 22 wherein the axes of said first and second pivot points define a plane so that when said means is in said release position said third pivot is on one side of said plane and when said means is in said clamping position said third pivot is on the other side of said plane.

24. The clamping mechanism according to claim 23 including a pair of opposing cantilevered arms extending outwardly from a base, said nest being disposed in opposing faces of said arms, and said resilient means including said arms and a portion of said base adjacent said arms.

25. The clamping mechanism according to claim 24 wherein said first pivotal attachment includes a pin extending from a free end of one of said cantilevered arms through a hole in said first link, and said second pivotal attachment includes a pin extending from a free end of the other of said cantilevered arms through a hole in said second link.

* * * * *

UNITED STATES PATENT AND TRADEMARK OFFICE
CERTIFICATE OF CORRECTION

PATENT NO. : 5,321,917
DATED : June 21, 1994
INVENTOR(S) : Vinod J. Franklin, et al.

It is certified that error appears in the above-identified patent and that said Letters Patent is hereby corrected as shown below:

Claim 2, column 6, line 2: "movement" should be --movements--

Claim 17, line 16: insert --one-- between "said" and "terminated"

Claim 19, column 8, line 2: before "said one terminated end of said cable" insert --moveable away therefrom to a release position to release--

Signed and Sealed this

Thirtieth Day of August, 1994

Attest:

BRUCE LEHMAN

Attesting Officer     Commissioner of Patents and Trademarks